(12) United States Patent
Anderson et al.

(10) Patent No.: US 11,242,278 B2
(45) Date of Patent: Feb. 8, 2022

(54) TAPERED FURNACE MUFFLES

(71) Applicant: Corning Incorporated, Corning, NY (US)

(72) Inventors: Erling Richard Anderson, Wilmington, NC (US); John Michael Jewell, Wilmington, NC (US); Robert Walter Nason, Wilmington, NC (US); Elias Panides, Horseheads, NY (US); Xiaoyong Wang, Shanghai (CN); Leo Young Zheng, Painted Post, NY (US); Chunfeng Zhou, Painted Post, NY (US)

(73) Assignee: Corning Incorporated, Corning, NY (US)

(*) Notice: Subject to any disclaimer, the term of this patent is extended or adjusted under 35 U.S.C. 154(b) by 395 days.

(21) Appl. No.: 16/298,605

(22) Filed: Mar. 11, 2019

(65) Prior Publication Data

US 2019/0284084 A1    Sep. 19, 2019

(30) Foreign Application Priority Data

Mar. 15, 2018    (CN) .......................... 201810213262.4

(51) Int. Cl.
*C03B 37/029* (2006.01)
*F27B 5/10* (2006.01)
*C03B 37/083* (2006.01)
*F27B 5/14* (2006.01)

(52) U.S. Cl.
CPC .......... *C03B 37/029* (2013.01); *C03B 37/083* (2013.01); *F27B 5/10* (2013.01); *F27B 5/14* (2013.01); *C03B 2205/82* (2013.01); *C03B 2205/92* (2013.01)

(58) Field of Classification Search
CPC ..... C03B 23/047; C03B 23/118; C03B 37/02; C03B 37/025; C03B 37/029
See application file for complete search history.

(56) References Cited

U.S. PATENT DOCUMENTS

| | | | |
|---|---|---|---|
| 5,637,130 A | 6/1997 | Nagayama et al. | |
| 6,345,519 B1 * | 2/2002 | Dickinson, Jr. | ....... C03B 37/027 65/379 |
| 6,810,692 B2 | 11/2004 | Taru et al. | |

FOREIGN PATENT DOCUMENTS

| | | | | |
|---|---|---|---|---|
| CN | 108975677 A | * | 12/2018 | |
| JP | 62138340 A | | 6/1987 | |
| JP | 62162647 A | * | 7/1987 | .......... C03B 37/029 |
| JP | 04187538 A | | 7/1992 | |
| JP | 04310533 A | * | 11/1992 | .......... C03B 37/029 |
| WO | 1999023040 A1 | | 5/1999 | |

OTHER PUBLICATIONS

Machine translation of CN 108975677 A (Year: 2018).*
International Search Report and Written Opinion PCT/US2019/021969 dated May 21, 2019, 11 Pgs.

* cited by examiner

*Primary Examiner* — Cynthia Szewczyk (57) ABSTRACT

An optical fiber draw furnace muffle includes a body portion defining a substantially cylindrical cavity extending along a centerline axis of the muffle. A tapered portion has an interior surface which defines a first curved portion with a first radius of curvature and a second curved portion with a second radius of curvature. At least one of the first and second radii of curvature has a radius greater than a radius of the cylindrical cavity.

20 Claims, 8 Drawing Sheets

TAPERED FURNACE MUFFLES

This application claims the benefit of priority to Chinese Patent Application No. 201810213262.4 filed on Mar. 15, 2018, the content of which is relied upon and incorporated herein by reference in its entirety.

FIELD OF THE DISCLOSURE

The disclosure relates to furnace muffles, and more particularly to muffles for optical fiber draw furnaces

BACKGROUND

Graphite is widely used in muffles of fiber draw furnaces due to its high operating temperature. Graphite oxidation may take place at elevated temperatures. Oxidation of the graphite may result in grains and/or particles of graphite breaking free from the muffle and contacting a fiber being drawn. In addition to grains and particles traveling through the muffle, one or more gases which are typically destructive to the muffle may be generated. The motion of the particles and gases is affected by the shape and design of the muffle. Accordingly, new muffle designs may be advantageous.

SUMMARY OF THE DISCLOSURE

According to some embodiments of the present disclosure, an optical fiber draw furnace muffle includes a body portion defining a substantially cylindrical cavity extending along a centerline axis of the muffle. A tapered portion has an interior surface which defines a first curved portion with a first radius of curvature and a second curved portion with a second radius of curvature. At least one of the first and second radii of curvature has a radius greater than a radius of the cylindrical cavity.

According to some embodiments of the present disclosure, an optical fiber draw furnace muffle includes a body portion defining a substantially cylindrical cavity extending along a centerline axis of the muffle. A tapered portion has an interior surface which defines a curved portion having a radius of curvature of from about 10 cm to about 100 cm. The tapered portion defines an insert recess configured to receive a muffle insert. At least one of the muffle and the muffle insert includes graphite.

According to further embodiments of the present disclosure, an optical fiber production system includes an optical fiber preform including glass. A heater and a muffle including a body portion is positioned around the preform. The heater is positioned proximate the body portion and configured to heat the preform therein. A tapered portion has an interior surface defining a first curved portion having a first radius of curvature and a second curved portion having a second radius of curvature. At least one of the first and second radii of curvature is from about 10 cm to about 100 cm.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure and the appended claims.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following embodiments.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
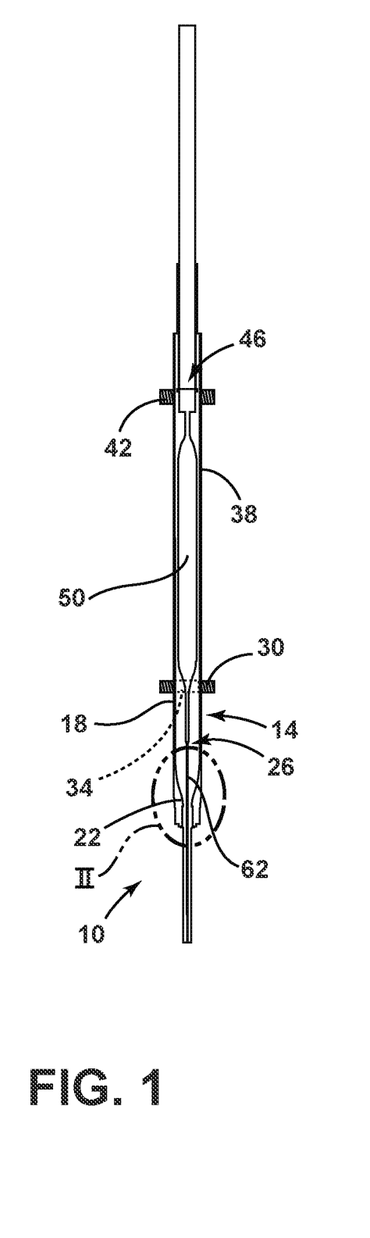
FIG. 1 is a schematic optical fiber production system, according to at least one example.
Figure 2:
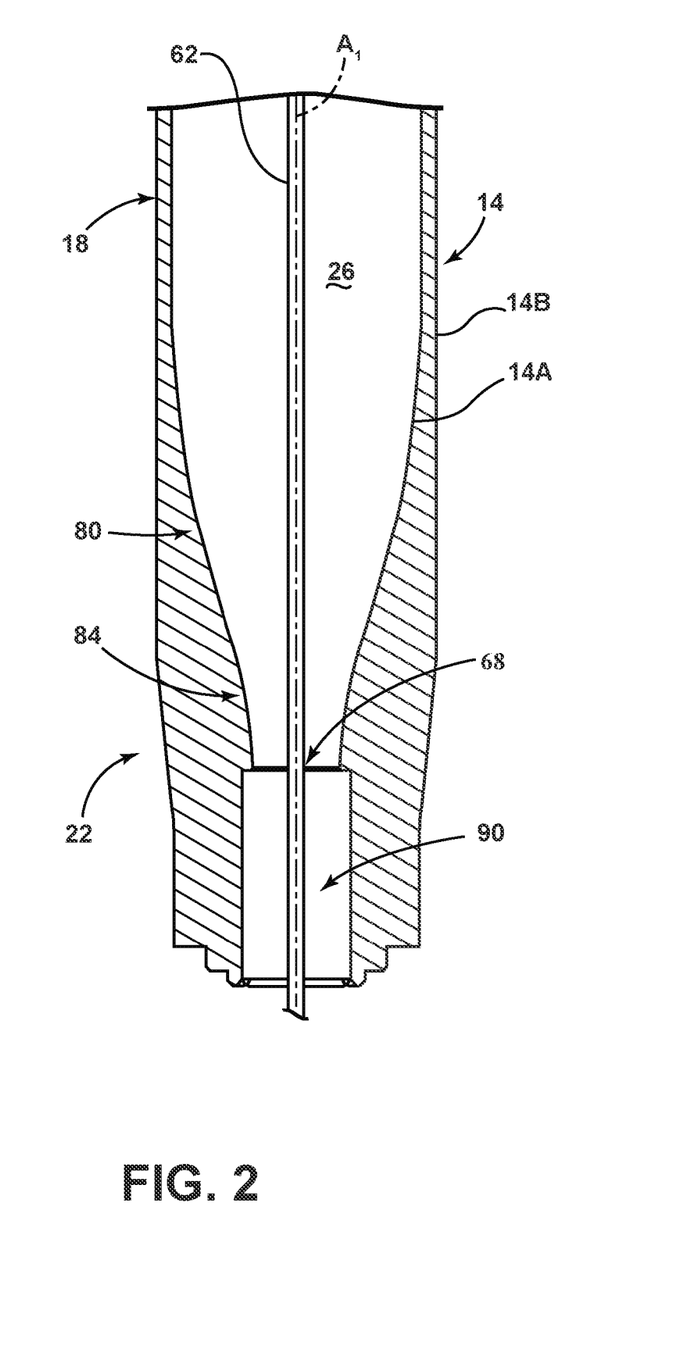
FIG. 2 is an enhanced view of the tapered portion of the muffle taken at section II of FIG. 1, according to at least one example.

Referring to FIGS. 1 and 2, an optical fiber production system 10 is schematically shown. The system 10 includes a muffle 14 having a body portion 18 and a tapered portion 22. The muffle 14 has an interior surface 14A and a centerline axis $A_1$. The interior surface 14A of the muffle 14 extends between the body portion 18 and the tapered portion 22. The muffle 14 defines a cavity 26 therein. The cavity 26 extends between the body portion 18 and the tapered portion 22. A heater 30 is coupled to the muffle 14 and is configured to create a hot zone 34 within the cavity 26. An upper muffle extension 38 is positioned above the muffle 14. A gas screen 42 is coupled with the upper muffle extension 38 and is configured to inject a process gas into the upper muffle extension 38 and/or the muffle 14. A downfeed handle 46 is positioned within the upper muffle extension 38 and is configured to support an optical fiber preform 50.

The heater 30 is thermally coupled to the muffle 14 and is configured to create the hot zone 34 within the system 10. Specifically, the hot zone 34 is generated within the cavity 26 of the muffle 14. The heater 30 is positioned proximate the body portion 18 of the muffle 14 and configured to heat the optical fiber preform 50 therein. It will be understood that the heater 30 may additionally or alternatively be positioned proximate the tapered portion 22. According to various examples, the heater 30 may be an induction heater. The hot zone 34 may have a temperature of from about 1700° C. to about 2100° C. For example, the hot zone 34 may have a temperature of about 1700° C., 1800° C., 1900° C., 2000° C., or about 2100° C. As will be explained in greater detail below, the heat of the hot zone 34 is sufficient to decrease the viscosity and/or melt the optical fiber preform 50 such that an optical fiber 62 may be drawn therefrom.

The upper muffle extension 38 may be an annular structure which is coupled to the muffle 14. As such, process gases from the gas screen 42 are passed into the upper muffle extension 38 and pass or flow into the cavity 26 of the muffle 14. The process gas may be helium, argon, nitrogen and/or other gases which are inert to the muffle 14, upper muffle extension 38 and/or optical fiber preform 50. It will be understood that the process gas may further include one or more impurities (e.g. $O_2$) which may be reactive with components of the system 10. The upper muffle extension 38 is sized and positioned to receive the downfeed handle 46. The downfeed handle 46 may be hollow or solid. The downfeed handle 46 may have an outside diameter of from about 6 cm to about 15 cm, or from about 7 cm to about 13 cm, or from about 8 cm to about 12 cm. The downfeed handle 46 is coupled to a motor which allows the handle 46 to move in and out of the upper muffle extension 38. As will be explained in greater detail below, the downfeed handle 46 may move through the upper muffle extension 38 such that as the optical fiber preform 50 is consumed (e.g., through the production of the optical fiber 62), the handle 46 may continuously move the optical fiber preform 50 into the hot zone 34. As the downfeed handle 46 is moved in and out of the upper muffle extension 38, the optical fiber preform 50 is moved in and out of the hot zone 34. The process gas moves through the upper muffle extension 38 and into the muffle 14. As will be explained in greater detail below, the interaction with and flow of the process gas through the muffle 14 may have an effect on both the quality of the optical fiber 62 drawn from the optical fiber preform 50 and a lifespan of the muffle 14.

In operation of the system 10, the optical fiber preform 50 is at least partially positioned within the body portion 18 of the muffle 14. As such, the body portion 18 is positioned around the preform 50. The optical fiber preform 50 may be constructed of any glass or material and may be doped suitable for the manufacture of optical fibers 62. According to various examples, the optical fiber preform 50 may include a core and a cladding. As the optical fiber preform 50 reaches the hot zone 34, the viscosity of the optical fiber preform 50 is lowered such that the optical fiber 62 may be drawn therefrom. As the optical fiber preform 50 is consumed through the production of the optical fiber 62, the downfeed handle 46 may continuously lower into the upper muffle extension 38 and/or muffle 14 such that new portions of the optical fiber preform 50 are exposed to the hot zone 34. The optical fiber 62 is drawn from the optical fiber preform 50 out through an outlet 68 of the muffle 14 and may be wound onto a spool. The optical fiber 62 is generally drawn through the muffle 14 along the centerline axis $A_1$. It will be understood that one or more lower muffle extensions, cooling systems, process gas reclamation systems and/or coating systems may be positioned below, or downstream, of the muffle 14 without departing from the teachings provided herein.

The muffle 14 and/or upper muffle extension 38 may be composed of a refractory material such as graphite, zirconia, binders and/or combinations thereof. As such, one or more of the muffle 14 and upper muffle extension 38 includes carbon. The muffle 14 and upper muffle extension 38 may be configured to retain heat within the system 10 as well as protect other components of the system 10 from excess temperatures. Although the materials of the muffle 14 and/or upper muffle extension 38 may generally be good insulators, oxidation may occur at elevated temperatures. Although described as separate structures, it will be understood that the muffle 14 and the upper muffle extension 38 may be a single component or composed of more than two components. Further, lower muffle extensions may also be combined with the muffle 14 without departing from the teachings provided herein.

As explained above, while graphite offers superior thermal resistance properties, oxidation of graphite examples of the muffle 14 may also increase the likelihood of draw induced point defects ("DIPDs") being generated on the optical fiber 62. Oxidation occurs when gases from the ambient atmosphere and/or impurities within the process gas react with the graphite muffle 14 at high temperature according to equations (1) and (2):

$$C+O_2 \rightarrow CO_2 \qquad (1)$$

$$C+CO_2 \rightarrow 2CO \qquad (2)$$

Additionally or alternatively, silica particles (e.g., from the optical fiber preform 50) can oxidize carbon based materials based on reaction (3):

$$C+SiO_2 \rightarrow SiC+2CO \qquad (3)$$

These reactions at the muffle 14 with oxygen, silicon dioxide and oxide containing gases may cause the muffle 14 to be consumed, especially at elevated drawing temperatures for the optical fiber 62.

In graphite examples of the muffle 14, the graphite material of the muffle 14 is a composite of graphite grains bonded together by a graphitized carbon binder matrix. The binder material is more susceptible to oxidation than the graphite grains. Therefore, when the composite of the two materials is exposed to oxygen-containing compounds at high temperatures, the matrix binder material preferentially oxidizes. The graphite grains, having no binder left to hold them in place, are then free to fall away from muffle 14. Without being bound by theory, it is believed that this mechanism causes graphite particulates to migrate from the muffle 14 to the optical fiber 62 during drawing thereby inducing DIPDs. DIPDs manifest themselves as sharp attenuation increases in the signal transmitted through the optical fiber 62. The larger the graphite particulate, the greater the chance of the DIPD being formed on the optical fiber 62.

Without being bound by theory, it is believed that conventional muffle designs result in the agglomeration of particles on the muffle 14 which form DIPDs in addition to retaining and/or recirculating gases which are deleterious to the muffle 14. For example, drastic reductions (e.g., at the tapered portion 22) in the diameter of the muffle 14 (e.g., 45° or greater as measured from the centerline axis $A_1$ of the muffle 14) may cause particles to strike the interior surface 14A of the muffle 14 and stick. The sticking of these particles results in agglomerations which increase the size of the particle. The agglomerations may break free from the interior surface 14A of the muffle 14 based on the flow pattern of the process gas through the muffle 14 and contact the optical fiber 62. In addition to collecting and agglomerating the particles, sharp decreases in the inner diameter of the muffle 14 may cause recirculation, or reversed flow, of gasses such as CO rather than being transported out of the furnace system 10. Such a recirculation may result in a decreased life expectancy of the muffle 14 based on equations (1), (2) and (3) listed above. In other words, the gases which tend to deteriorate the muffle 14 may have an increased residency time within the muffle 14 due to recirculation, resulting in a decreased life expectancy of the muffle 14.

As explained above, the muffle 14 is composed of the body portion 18 and the tapered portion 22. It will be understood that the body portion 18 and the tapered portion 22 may be separate components from one another such that the muffle 14 is composed of multiple pieces. Further, the body portion 18 and/or the tapered portion 22 may each be composed of multiple separate components or pieces. The muffle 14 may have a length of from about 100 cm to about 140 cm. The body portion 18 of the muffle 14 may have a thickness of between about 0.6 cm to about 4 cm, or from about 1.25 cm to about 2.5 cm, or from about 1.8 cm to about 2.0 cm. In a specific example, the thickness of the body portion 18 (e.g., as measured from the interior surface 14A to an exterior surface 14B) of the muffle 14 may be about 1.9 cm. The body portion 18 is positioned above the tapered region 22 and generally defines the cavity 26 within which the optical fiber preform 50 is positioned. The cavity 26 is generally cylindrical in shape in the body portion 18 and extends along the centerline axis $A_1$. The portion of the cavity 26 defined by the body portion 18 may have a substantially uniform radius and/or diameter. The radius of the cavity 26 may be from about 6 cm to about 10 cm, or from about 7 cm to about 9 cm. The body portion 18 may have a length of from about 64 cm to about 89 cm. The muffle 14 defines the interior surface 14A which extends between the body portion 18 and the tapered portion 22.

The tapered portion 22 of the muffle 14 is below the body portion 18 of the muffle 14. The tapered portion 22 may generally be delineated from the body portion 18 by the start of an internal taper (e.g., narrowing of the internal diameter of the muffle 14 by the interior surface 14A) and/or a tapering of the exterior surface 14B of the muffle 14. The tapered portion 22 generally tapers down, or necks down, to the outlet 68 of the muffle 14. The outlet 68 of the muffle 14 is generally the exit (e.g., or narrowest portion) of the cavity 26 defined by the muffle 14.

The interior surface 14A of the tapered portion 22 is both curved around a circumference of the muffle 14 to define the cavity 26 (e.g., to form the circular cross-sectional shape of the muffle 14), as well as curved toward and away from the centerline axis $A_1$ of the muffle 14. In the depicted example, the interior surface 14A defines a first curved portion 80 having a first radius of curvature and a second curved portion 84 having a second radius of curvature. Although depicted as including two curved portions, it will be understood that the interior surface 14A of the muffle 14 may define one or more than two curved portions. The first curved portion 80 is generally positioned above, or upstream (e.g., relative to the process gas flow), of the second curved portion 84. The first and second curved portions 80, 84 may be in contact with one another or may be separated by a portion of the interior surface 14A which is linear (e.g., including a linear taper or no taper at all). It will be understood that in examples where the first and second curved portions 80, 84 are in contact, an inflection point, or flat portion may exist. The first and/or second curved portions 80, 84 may extend around a portion, a majority, substantially all or all of a circumference of the cavity 26. In examples where the tapered portion 22 is composed of multiple separate components, the first and second curved portions 80, 84 may be defined on separate components of the tapered portion 22.

For purposes of this disclosure, the radius of curvature of a curved surface (e.g., the first and/or second curved portions 80, 84) equals the radius of the circular arc which best approximates the curve of that surface where the curve remains constant. In other words, the first and second radii of curvature are the radii of the circular arcs which best approximates the entirety of the first and second curved portions 80, 84, respectively. The first and second radii of curvature may be different, substantially the same or the same as one another. Further, the first and second curved portions 80, 84 may have one or more radii of curvature. The radius of curvature for the first curved portion 80 may range from about 50 cm to about 100 cm, or from about 60 cm to about 90 cm, or from about 70 cm to about 80 cm and all values therebetween. In a specific example, the first radius of curvature may be about 70 cm. The second radius of curvature of the second curved portion 84 may range from about 10 cm to about 40 cm, or from about 20 cm to about 30 cm and all values therebetween. In a specific example, the second radius of curvature may be about 25.4 cm. In other words, the tapered portion 22 of the muffle 14 defines the interior surface 14A as having a curved portion (e.g., the first or second curved portions 80, 84) having a radius of curvature of from about 10 cm to about 100 cm. Further, at least one of the first and second radii of curvature has a radius greater than a radius of the cylindrical cavity 26. The first and second curved portions 80, 84 may be concave or convex relative to the centerline axis $A_1$ of the muffle 14. For example, the first curved portion 80 may be concave relative to the centerline axis $A_1$ of the muffle 14. In such an example, the radius of curvature would extend generally toward the centerline axis $A_1$. In another example, the second curved portion 84 may be convex relative to the centerline axis $A_1$ of the muffle 14 such that the radius of curvature of the second curved portion 84 may generally point away from the centerline axis $A_1$.

The first and second curved portions 80, 84 of the tapered portion 22 of the muffle 14 are configured to streamline the flow of the process gas through the muffle 14. As explained above, conventional muffle designs having sharp decreases in the inner diameter of the muffle 14 (e.g., through fast tapering of the interior surface 14A toward the centerline axis $A_1$) may lead to pressure increases, particle agglomeration and/or gas recirculation. By utilizing an interior surface with high radii of curvature, the first and second curved portions 80, 84 allow for a gradual and smooth decrease in the diameter of the cavity 26. The gradual and smooth decrease in cavity diameter allows for a "soft landing" of the particles on the interior surface 14A such that agglomeration of the particles is decreased and/or eliminated. In other words, the particles pass through the outlet 68 and away from the optical fiber 62. Additionally, as the first and second curved portions 80, 84 streamline the flow of the process gas more than conventional designs, gases which tend to deteriorate the muffle 14 may be efficiently expelled without undue recirculation. Such features may be advantageous in reducing DIPDs and increasing muffle lifetime.

The tapered portion 22 of the muffle 14 may define the exterior surface 14B which is also tapered. For example, the exterior surface 14B may be tapered at an angle of between about 8° and about 16° relating to the body portion 18. In a specific example, the exterior surface 14B may be tapered at an angle of about 12° relative to the body portion 18. The tapered portion 22 of the muffle 14 may be thicker than the body portion 18 due to the first and second curved portions 80, 84 decreasing the diameter of the cavity 26. For example, the thickness of the tapered portion 22 as measured from the interior surface 14A to the exterior surface 14B may be from about 5 cm to about 15 cm while the body portion 18 may have a thickness of from about 1 cm to about 3 cm. According to various examples, the tapered portion 22 may be thicker than conventional muffle designs. As such, a greater amount of muffle 14 may need to be deteriorated before cracks and/or breakage occurs. In practical terms, the increased amount of muffle 14 may lead to a longer usable life of the muffle 14 as well as an increase in the efficiency of the muffle 14 to retain heat.

Figure 3A:
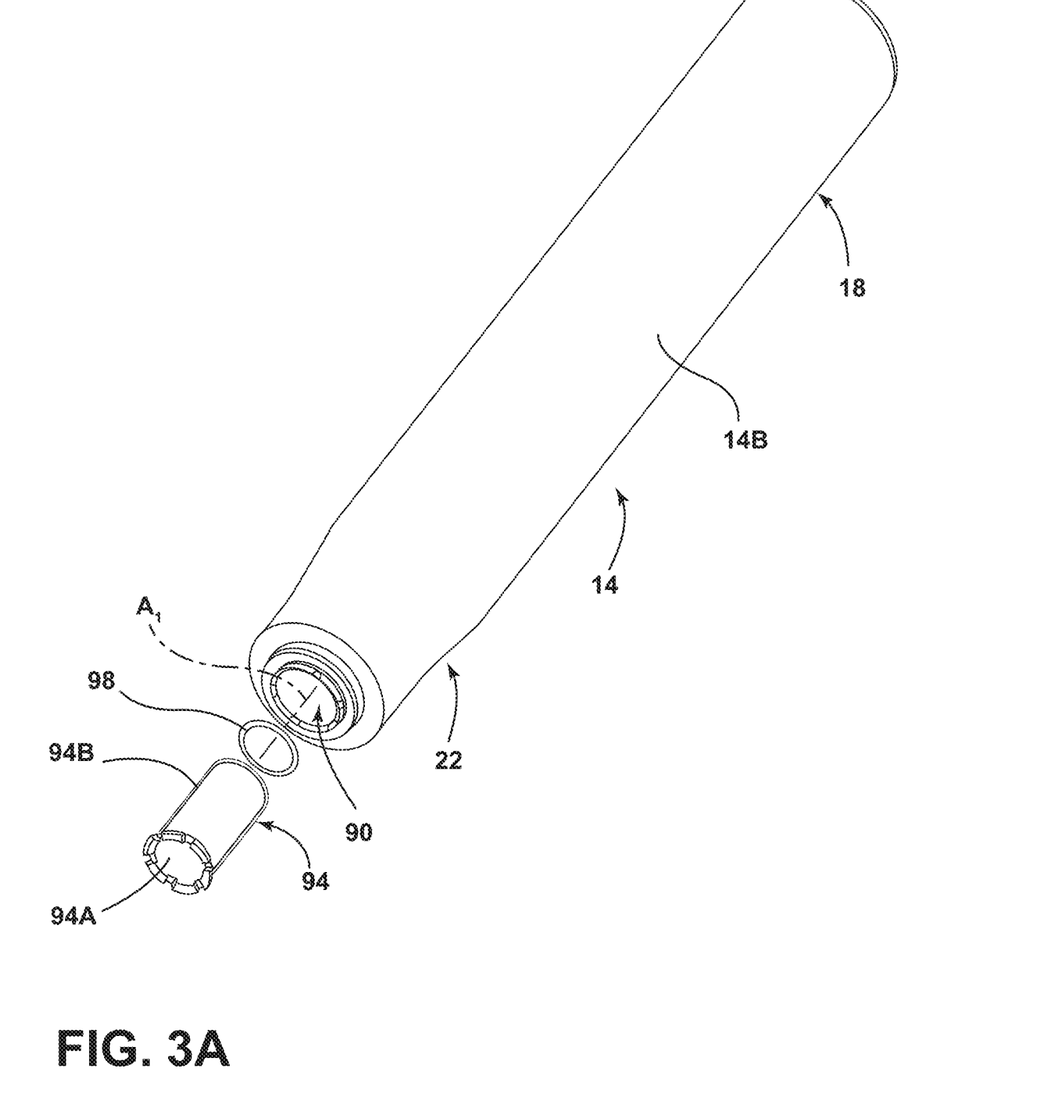
FIG. 3A is a perspective view of the muffle, according to at least one example.
Figure 3B:
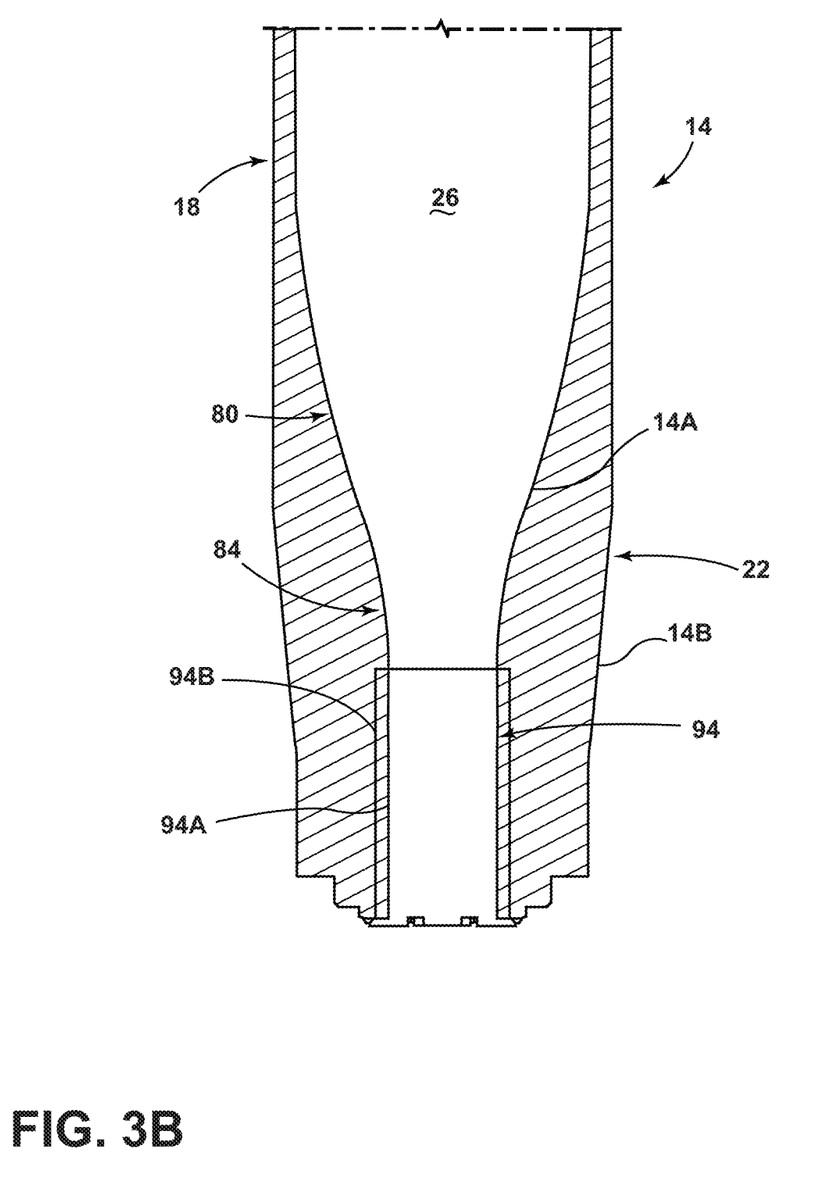
FIG. 3B is a cross-sectional view of the muffle, according to at least one example.
Figure 4:
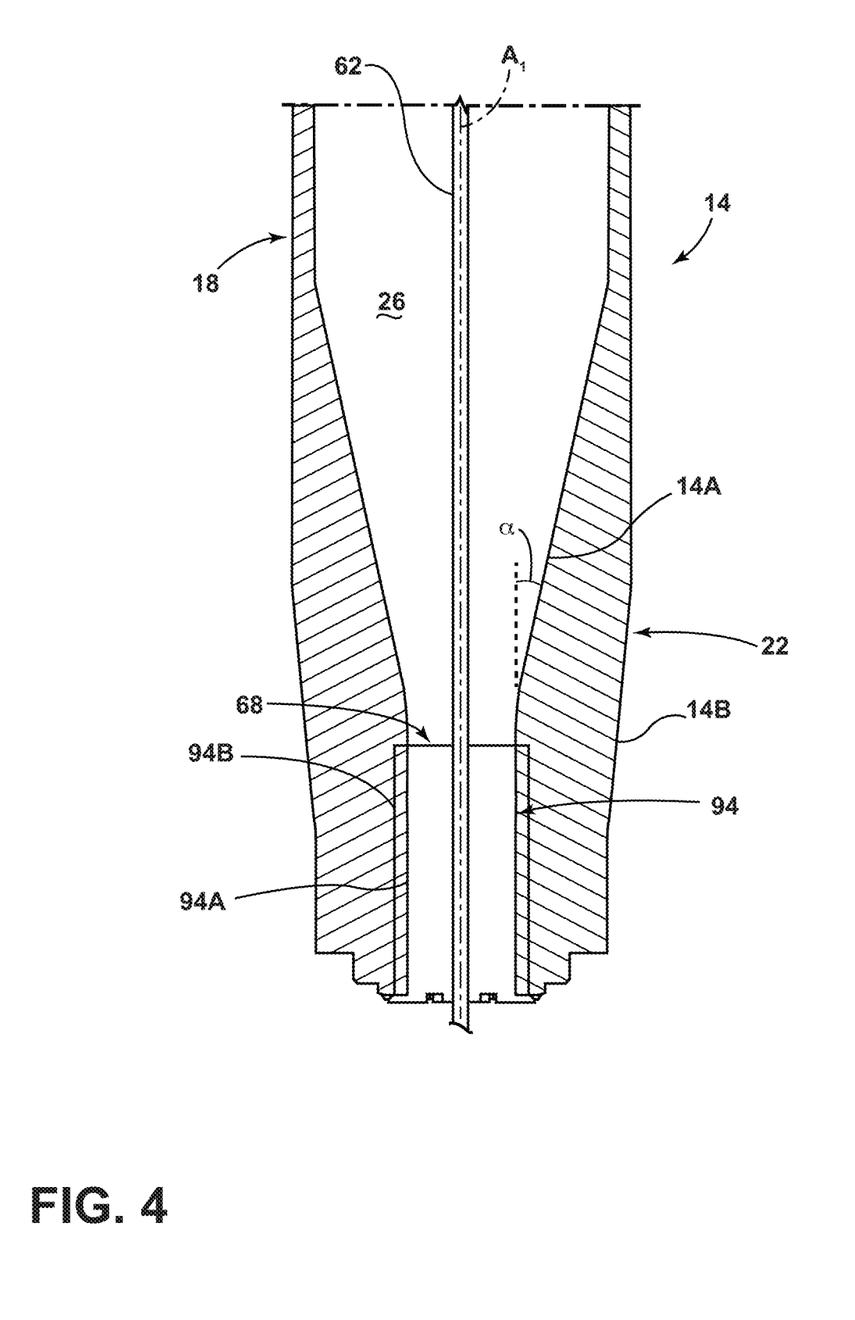
FIG. 4 is a cross-sectional view of the muffle, according to another example.

Referring now to FIGS. 2-4, the tapered portion 22 of the muffle 14 defines the outlet 68 of the cavity 26. The outlet 68 opens to an insert recess 90 which is configured to receive an insert 94 and a gasket 98. Although depicted with a single gasket 98, it will be understood that the muffle 14 may include no gaskets 98 or a plurality of gaskets 98. The gasket 98 may be formed from a graphite laminate (e.g., graphite with stabilizing inserts of stainless steel, carbon steel or wire mesh), woven and/or compressed graphite foil, ceramic fiber blankets and/or combinations thereof. The gasket 98 ensures a seal between the insert 94 and the muffle 14.

The insert 94 is configured to be positioned within the insert recess 90. As such, the insert 94 is positioned below, or downstream, of the optical fiber preform 50 while in the muffle 14. The insert 94 may be formed of any of the above-noted materials described in connection with the muffle 14 and/or the gasket 98. According to various examples, the insert 94 may include graphite. An inner insert surface 94A of the insert 94 is configured to be substantially flush with the interior surface 14A of the muffle 14 such that gas flow through the tapered portion 22 of muffle 14 is unimpeded by the insert 94. Further, the optical fiber 62 may extend through the insert 94 while the optical fiber preform 50 is having the fiber 62 drawn therefrom. The insert 94 may have an internal diameter of from about 4 cm to about 10 cm, or about 5 cm to about 7 cm and all values therebetween. The insert 94 may have an external diameter of from about 5 cm to about 10 cm and all values therebetween. The insert 94 may have a length, as measured in the same direction as the centerline axis $A_1$ of the muffle 14, of between about 8 cm and about 17 cm, or between about 10 cm and about 15 cm, or between about 12 cm and about 13 cm and all values therebetween. In a specific example, the insert 94 may have a length of about 12.7 cm. In some examples, the insert 94 can be fully positioned within the tapered portion 22 of the muffle 14, while in other examples the insert 94 may only be partially disposed within the tapered portion 22 of the muffle 14. In operation, the insert 94 is configured to collect large particles which are traveling through the gas stream of the muffle 14. Such a feature may be advantageous in allowing the insert 94 to be removed from the muffle 14, thereby removing particulates while not requiring full removal of the muffle 14.

Referring now to FIG. 4, depicted is an example of the muffle 14 having a tapered region 22 without the first and second curved portions 80, 84 (FIG. 2). In the depicted example, the interior surface 14A of along the tapered portion is straight, or linear, and leads directly to the insert 94. The interior surface 14A may have an angle α relative to the centerline axis of about 45° or less. For example, α may be from about 1° to about 40°, or about 10° to about 30° or about 15° to about 25°. For example, α may be about 5°, about 6°, about 7°, about 8°, about 9°, about 10°, about 11°, about 12°, about 13°, about 14°, about 15°, about 16°, about 17°, about 18°, about 19° or about 20° and all values therebetween. Similarly to the curved portions 80, 84 of FIG. 2, by decreasing the angle of the interior surface 14A, or decreasing the rate of cavity 26 diameter reduction, particles within the process gas do not stick to the interior surface 14A and agglomerate. Further, as the flow path for the process gas has been streamlined relative to conventional designs, the reversed flows in the process gas are decreased and/or eliminated. As with the other examples of the muffle 14, the tapered portion 22 may include the insert 94.

Use of the presently disclosed muffle 14 may offer a variety of advantages. First, by streamlining the flow of process gases through the cavity 26 of the muffle 14, the number and/or concentrations of DIPDs may be reduced compared to conventional designs. For example, use of the presently disclosed muffle 14 may result in a 37% or greater reduction of DIPDs as compared to conventional designs. As explained above, by decreasing the likelihood of particles sticking to the interior surface 14A, agglomeration of particles is reduced which will reduce DIPDs. Further, as the process gases are streamlined through the muffle 14, gases which tend to oxidize or damage the muffle 14 may be expeditiously removed from the muffle 14. Second, as the tapered portion 22 of the muffle 14 is thicker than conventional muffle designs, the muffle 14 may have an increased lifetime before cracking. In other words, in addition to reducing the likelihood of oxidation, the greater volume of the muffle 14 in the tapered portion 22 increases the amount of muffle 14 which must be damaged before cracking and failure occurs. As such, a single muffle 14 may have a useable life of about twelve months or greater. Third, as the body portion 18 of the muffle 14 is decreased relative to conventional designs and the volume of the tapered portion 22 is increased, the heater 30 may more efficiently heat the hot zone 34 and the optical fiber preform 50 while also retaining more heat. The increase in efficiency of the muffle 14 may result in a decrease in the energy costs associated with powering the furnace system 10. For example, an average of about 5 kW of power may be saved using the thinner body portion 18 as compared to conventional designs. Fourth, as the insert 94 is removable from the muffle 14, the entirety of the muffle 14 may not need to be serviced in order to clear large particles from the muffle 14. Such a feature is advantageous in decreasing damage from occurring to the muffle 14 while cleaning, in addition to reducing production downtime for cleaning the muffle 14.

EXAMPLES

The following examples represent certain non-limiting examples of the muffle of the present disclosure, including the methods of making them.

Figures 5A, 5B:
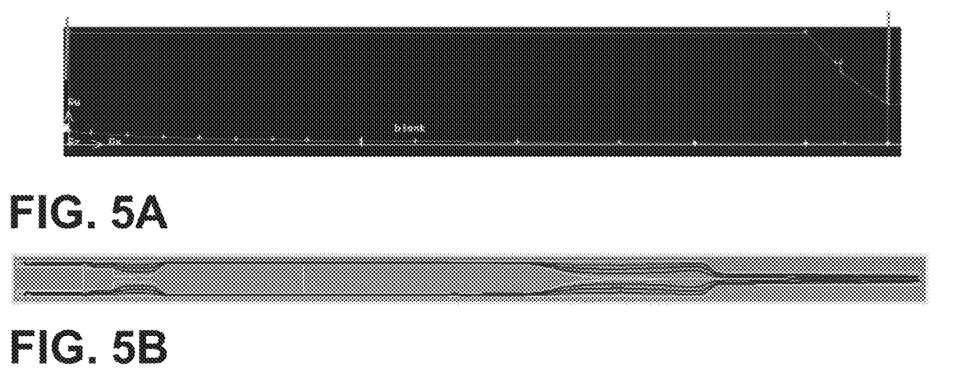
FIG. 5A is a contour plot of an inner wall profile of a refractory.
FIG. 5B is a particle pathline flow diagram of gas flow through the refractory of FIG. 5A.

Referring now to FIGS. 5A-7B, depicted are contour plots and path line plots for conventional and exemplary refractory elements (e.g., muffle 14). The left edge of the contour plots are positioned at a center of a furnace (e.g., the heater 30) while the right edge is proximate an end (e.g., the outlet 68) of the refractory element. FIG. 5A is a contour plot and FIG. 5B is a path line plot for a Comparative Example 1 of a conventional refractory element. In Comparative Example 1, a conventional refractory design is provided having an approximately 45° angle of reduction at a refractory reduction point (e.g., the tapered portion 22) proximate the end of the refractory element. As can be seen, the path lines accumulate at the reduction point, indicating the building of gas pressure at the reduction point. The concentration of gas and gas pressure increase may lead to flow instability and reversed flow within the refractory element. Further, such a configuration may lead particles to strike and agglomerate. Such instability and reversed flow may result in the breaking free of larger agglomerated particles which are carried by the reverse flow and result in DIPDs in a fiber optic (e.g., optical fiber 62) drawn in the conventional refractory.

Figure 6A:
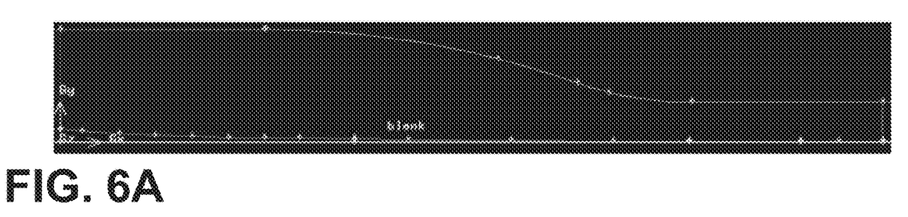
FIG. 6A is contour plot of an inner wall profile of a refractory.
Figure 6B:
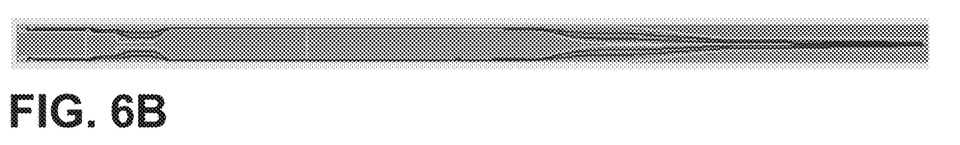
FIG. 6B is a particle pathline flow diagram of gas flow through the refractory of FIG. 6A.

Referring now to FIGS. 6A and 6B, FIG. 6A is a contour plot and FIG. 6B is a path line plot for Example 1 of a refractory element according to the present disclosure. In Example 1, the refractory element includes two curved areas (e.g., the first and second curved portions 80, 84) along an inner surface (e.g., the interior surface 14A). A first, or upper, curved area (e.g., the first curved portion 80) has a radius of curvature of about 70 cm and a second, or lower, curved area (e.g., the second curved portion 84) has a radius of curvature of about 25.4 cm. As can be seen from the path lines of FIG. 6B, the flow paths are less concentrated near the refractory walls and the flow of the gas is generally more streamlined than in Comparative Example 1. As explained above, the streamlined nature of the refractory of Example 1 prevents a pressure build-up from taking place which may result in less particle agglomeration and reversed flow. With the decreased agglomeration and reversed flow, fewer large particles may be carried toward a fiber optic being drawn and may prevent a reverse flow from carrying particles upwards towards the fiber optic. As such, a lower amount of DIPDs is expected in such a fiber optic.

Figure 7A:
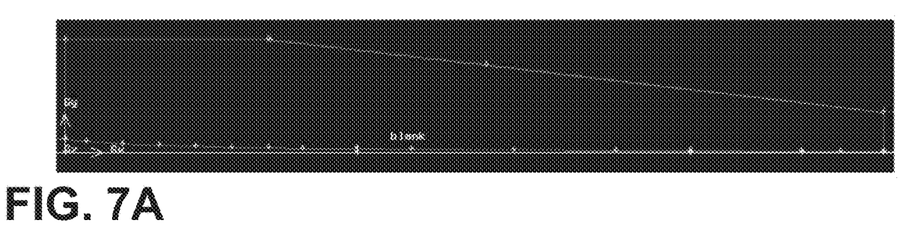
FIG. 7A is contour plot of an inner wall profile of a refractory.
Figure 7B:
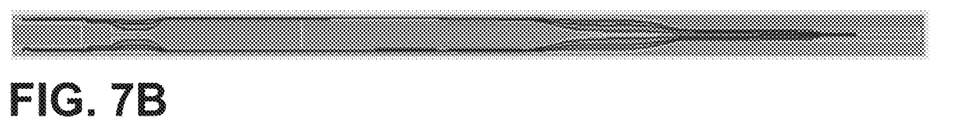
FIG. 7B is a particle pathline flow diagram of gas flow through the refractory of FIG. 7A.

Referring now to FIGS. 7A and 7B, depicted is a contour plot (FIG. 7A) and a path line plot (FIG. 7B) for Example 2. Example 2 includes a reduction point (e.g., tapered portion 22) which is linear, or straight. In the depicted example, an angle of the reduction point relative to a refractory axis (e.g., the centerline axis $A_1$) is between about 11° and about 12°. As can be seen in FIG. 7B, the path lines are highly streamlined through the refractory element indicating very little pressure build up and turbulence. Analysis of the results revealed that particles do not bounce off of the reduction point, but instead slide along the refractory element wall allowing particles to escape the refractory element and not agglomerate.

Figure 8:
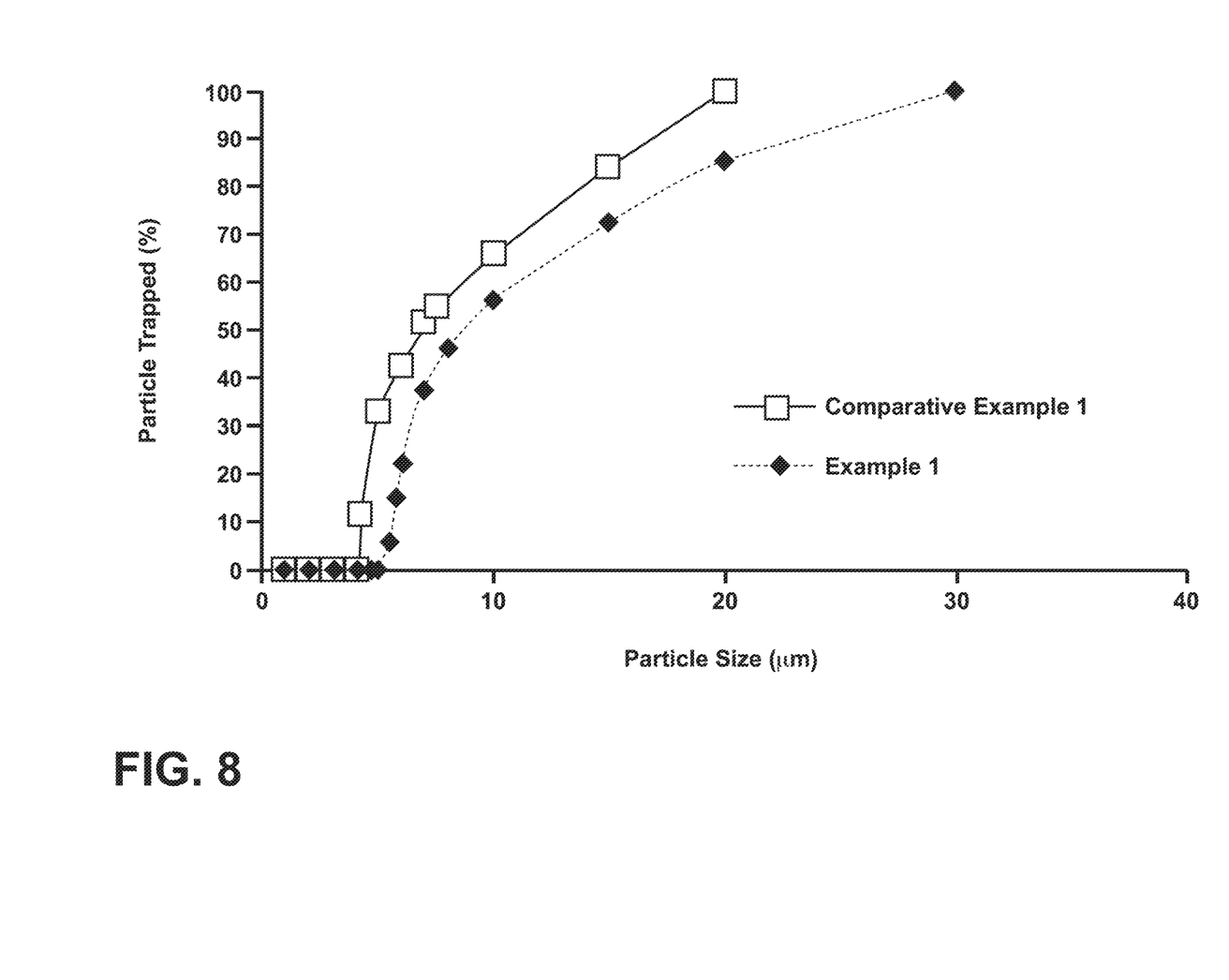
FIG. 8 is a plot of percentage particles trapped vs. particle size.

Referring now to FIG. 8, depicted is a plot showing the percentage of particles trapped vs particle size for Comparative Example 1 and Example 1. CFD modeling with particle tracking was used to predict the flow pattern and particle motion through the refractory elements. Various particle sizes ranging from 1 μm to 50 μm were used in the simulations. As can be seen from the plot, Example 1 which is streamlined accumulates about 20% fewer particles relative to Comparative Example 1. The decrease in particles trapped is advantageous as it is the trapped particles which agglomerate to generate DIPDs. As such, by decreasing the number of particles trapped (e.g., increasing the number of particles passing out of the system 10), the likelihood of DIPDs forming is decreased.

Figure 9:
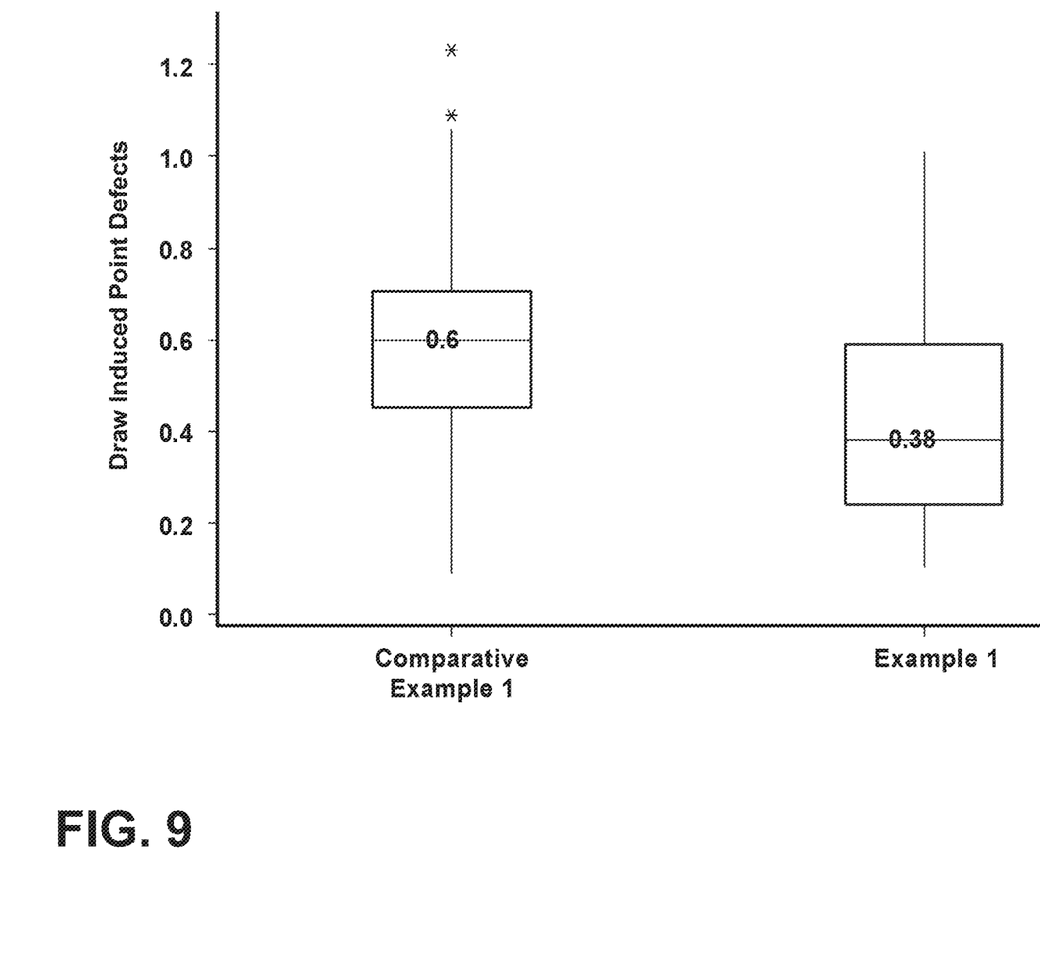
FIG. 9 is a box plot of number of draw induced point defects per 1000 km.

Referring now to FIG. 9, depicted is a plot of DIPDs per 1000 km of fiber optic produced using Comparative Example 1 and Example 1. As can be seen, the flow pattern of Example 1 purges more particles out of the refractory element which reduces the incidents of particle attachment to the fiber optic. Use of Example 1 of the refractory element results in a 37% reduction of DIPDs as compared to Comparative Example 1 which is a significant performance improvement. With the decrease in particle agglomeration, it is also expected that an increased purge rate of $SiO_2$ and oxygen-containing gases will be removed from the refractory element thereby increasing an expected lifespan.

Figure 10:
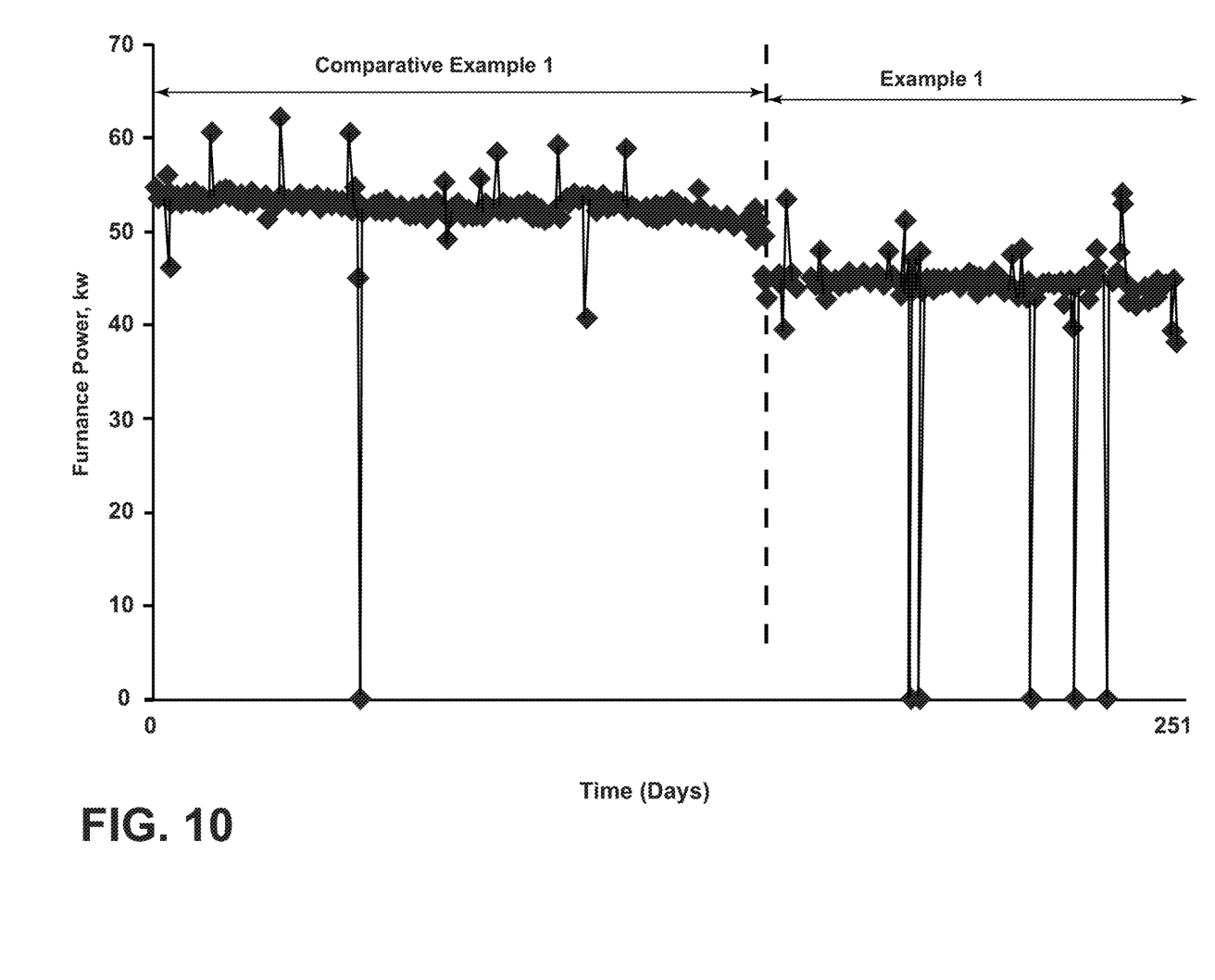
FIG. 10 is a plot of furnace power vs. time.

Referring now to FIG. 10, the thickness of the refractory element affects how much power is used to form the fiber optic. For example, it was determined that the furnace power usage dropped by about 5 kw when Example 1 of the refractory element was installed on the draw furnace (e.g., the system 10) as compared to Comparative Example 1. The reason for the increase in efficiency of the furnace is due to reduced heat loss owing to the large refractory element volume and thicker element wall (e.g., in the tapered portion 22).

What is claimed is:

1. An optical fiber draw furnace muffle, comprising:
 a body portion defining a substantially cylindrical cavity extending along a centerline axis of the muffle; and
 a tapered portion having an interior surface defining a first curved portion with a first radius of curvature and a second curved portion with a second radius of curvature, wherein at least one of the first and second radii of curvature has a radius greater than a radius of the cylindrical cavity, wherein at least one of the first and second radii of curvature is from about 10 cm to about 100 cm.

2. The furnace muffle of claim 1, wherein one of the first and second radii of curvature is concave relative to the centerline axis.

3. The furnace muffle of claim 2, wherein one of the first and second radii of curvature is convex relative to the centerline axis.

4. The furnace muffle of claim 1, wherein the tapered portion defines an insert recess configured to receive a muffle insert.

5. The furnace muffle of claim 4, wherein the muffle insert defines an insert surface which is substantially flush with the interior surface.

6. The furnace muffle of claim 5, wherein the insert has an internal diameter of from about 4 cm to about 10 cm and an external diameter of from about 5 cm to about 10 cm.

7. The furnace muffle of claim 4, wherein at least one of the muffle insert and the muffle comprises graphite.

8. The furnace muffle of claim 1, wherein at least one of the first and second radii of curvature is from about 50 cm to about 100 cm.

9. The furnace muffle of claim 1, wherein at least one of the first and second radii of curvature is from about 10 cm to about 40 cm.

10. An optical fiber draw furnace muffle, comprising:
 a body portion defining a substantially cylindrical cavity extending along a centerline axis of the muffle; and
 a tapered portion having an interior surface defining a curved portion having a radius of curvature of from about 10 cm to about 100 cm, the tapered portion defining an insert recess configured to receive a muffle insert, wherein at least one of the muffle and the muffle insert comprise graphite.

11. The furnace muffle of claim 10, further comprising:
 a gasket positioned between the muffle and the muffle insert.

12. The furnace muffle of claim 10, wherein the muffle insert has a length from about 5 cm to about 20 cm.

13. The furnace muffle of claim 10, wherein the muffle insert is in line with the centerline axis of the muffle.

14. An optical fiber production system, comprising:
 an optical fiber preform comprising glass;
 a heater;
 a muffle comprising:
  a body portion positioned around the preform, wherein the heater is positioned proximate only the body portion and configured to heat the preform therein; and
  a tapered portion having an interior surface defining a first curved portion having a first radius of curvature and a second curved portion having a second radius of curvature, wherein at least one of the first and second radii of curvature is from about 10 cm to about 100 cm.

15. The optical fiber production system of claim 14, further comprising:
 a muffle insert positioned within the muffle.

16. The optical fiber production system of claim 15, wherein the muffle insert is positioned proximate an outlet of the muffle.

17. The optical fiber production system of claim 15, wherein the muffle insert comprises graphite.

18. The optical fiber production system of claim 14, wherein one of the first and second radii of curvature is convex relative to a centerline axis of the muffle and one of the first and second radii of curvature is concave relative to the centerline axis of the muffle.

19. The optical fiber production system of claim 14, wherein the muffle comprises graphite.

20. The optical fiber production system of claim 14, wherein first and second curved portions are in contact.

* * * * *